US009038024B2

(12) United States Patent
Fippel

(10) Patent No.: US 9,038,024 B2
(45) Date of Patent: May 19, 2015

(54) DEVELOPMENT OF PROCESS INTEGRATION SCENARIOS ON MOBILE DEVICES

(75) Inventor: Bernhard Fippel, Heidelberg (DE)

(73) Assignee: SAP SE, Walldorf (DE)

( * ) Notice: Subject to any disclaimer, the term of this patent is extended or adjusted under 35 U.S.C. 154(b) by 130 days.

(21) Appl. No.: 13/606,350

(22) Filed: Sep. 7, 2012

(65) Prior Publication Data

US 2014/0075345 A1    Mar. 13, 2014

(51) Int. Cl.
G06F 9/44        (2006.01)
G06Q 10/06     (2012.01)

(52) U.S. Cl.
CPC .. G06F 8/71 (2013.01); G06F 8/34 (2013.01); G06Q 10/06 (2013.01)

(58) Field of Classification Search
USPC ......................................................... 717/122
See application file for complete search history.

(56) References Cited

U.S. PATENT DOCUMENTS

| | | | | |
|---|---|---|---|---|
| 6,006,034 | A * | 12/1999 | Heath et al. | 717/170 |
| 6,941,353 | B1 * | 9/2005 | Lane | 709/219 |
| 8,023,934 | B2 * | 9/2011 | Jeide et al. | 455/418 |
| 8,032,893 | B2 * | 10/2011 | Banik et al. | 707/610 |
| 2003/0068162 | A1 * | 4/2003 | Tsai et al. | 386/125 |
| 2004/0225416 | A1 * | 11/2004 | Kubota et al. | 701/1 |
| 2006/0168555 | A1 * | 7/2006 | Represas Ferrao et al. | 717/104 |
| 2007/0130223 | A1 * | 6/2007 | Savilampi et al. | 707/203 |
| 2009/0150569 | A1 * | 6/2009 | Kumar et al. | 709/248 |
| 2010/0131857 | A1 * | 5/2010 | Prigge | 715/744 |
| 2010/0241610 | A1 * | 9/2010 | Gibson et al. | 706/54 |
| 2011/0117898 | A1 * | 5/2011 | Pereira et al. | 455/414.4 |
| 2012/0066411 | A1 * | 3/2012 | Jeide et al. | 709/248 |
| 2012/0078928 | A1 | 3/2012 | Fippel et al. | |
| 2012/0188996 | A1 * | 7/2012 | Roka | 370/350 |
| 2013/0080993 | A1 * | 3/2013 | Stravers et al. | 717/104 |
| 2013/0124967 | A1 * | 5/2013 | Hatfield et al. | 715/232 |

OTHER PUBLICATIONS

Guerrero et al., "Selecting Computing Devices to Support Mobile Collaboration", 2006, Springer.*
Muller-Wilken et al., "On Integrating Mobile Devices into a Work_ ow Management Scenario", 2000, University of Hamburg.*
Nori, "Mobile and Embedded Databases", 2007, IEEE.*
Mueller et al., "Interactive Multimodal User Interfaces for Mobile Devices", 2004, Paderborn University.*

(Continued)

*Primary Examiner* — Wei Zhen
*Assistant Examiner* — Junchun Wu
(74) *Attorney, Agent, or Firm* — Fish & Richardson P.C.

(57) ABSTRACT

The disclosure generally describes computer-implemented methods, software, devices and systems for developing a process integration scenario on a mobile device. In one aspect, a method comprises: running a mobile application on a mobile device; editing a graphical element of the process integration scenario by a scenario editor of the mobile application based on input from a graphical user interface of the mobile device; translating the graphical element into an industry standard language by a renderer of the mobile application; generating an object version identifier that is associated with the process integration scenario by a versioning module of the mobile application; storing the process integration scenario in the industry standard language and the object version identifier in a local database.

21 Claims, 9 Drawing Sheets

(56) References Cited

OTHER PUBLICATIONS

SAP NetWeaver 7.3 EHP1—Enterprise Services Repository & Registry; http://help.sap.com/saphelp_nw73ehp1/helpdata/en/c7/4ce1aa448945b5bdf51566b09b86e3/frameset.htm; last visited: Sep. 10, 2012.

SAP NewWeaver 7.3 EHP1—Discovering Services in the Services Registry; http://help.sap.com/saphelp_nw73ehp1/helpdata/en/2e/8526937af346a0bc446905ea964ceb/frameset.htm; last visited Sep. 10, 2012.

SAP NetWeaver 7.3 EHP1—Managing Services in the Enterprise Services Repository; http://help.sap.com/saphelp_nw73ehp1/helpdata/en/61/fec608bc27654daadb20c1e6da7dd1/frameset.htm; last visited Sep. 10, 2012.

SAP NetWeaver 7.3 EHP1—Enterprise Services Builder; http://help.sap.com/saphelp_nw73ehp1/helpdata/en/32/306c15d227ca458216529d7a0472ff/frameset.htm; last visited Sep. 10, 2012.

SAP NetWEaver 7.3 EHP1—User Interface; http://help.sap.com/saphelp_nw/73eph1/helpdata/en/7a/dadf62c0254048b9074c4936918ccef/frameset.htm; last visited Sep. 10, 2012.

SAP NetWEaver 7.3 EHP1—Object Editor; http://help.sap.com/saphelp_nw73eph1/helpdata/en/e2/b1b6dcfc4d8543bdead490fbe84ce7/frameset.htm; last visited Sep. 10, 2012.

* cited by examiner

DEVELOPMENT OF PROCESS INTEGRATION SCENARIOS ON MOBILE DEVICES

TECHNICAL FIELD

The present disclosure relates to computer-implemented methods, software, devices and systems for developing process integration scenarios on mobile devices.

BACKGROUND

Process integration scenarios (e.g., business process diagrams) are used to visualize a message flow of a collaborative process which is outlined between multiple business partners and their interactions. These business partners can either refer to distinct components inside a single company or represent separate companies. Interactions between each of the business partners are made through the exchange of electronic messages. For each cross-component process step, i.e. the exchange of electronic messages between business partners, process integration scenarios depict the sender and receiver as well as the sending and receiving interfaces. In scenarios in which the sending and receiving interface are different, messages have to be transformed by separate transformation rules or mappings. Furthermore, a sender and a receiver might use different message protocols. These message protocols have to be transformed to allow for exchange between the sending and receiving interfaces. A process integration scenario comprises information of all the business partners involved and serves as a holistic depiction of a collaborative process.

Currently, there are many restrictions in the usage of process integration scenarios with regards to devices, presentation layers, licenses, and content prerequisites. For storing and visualizing collaborative processes, industry standard languages have been introduced, including, for example, Business Process Execution Language for Webservices (WS-BPEL). For the visualization of such scenarios using this language, a huge WS-BPEL-capable reader is so far necessary, such as an enterprise services repository (ESR).

For visualizing and storing collaborative processes, a customer needs to install and configure large software packages (e.g., an up-to-date Java runtime environment) on a computer and the computer is required to thoroughly possess an online connection to an ESR client-server application in a network environment. As a consequence, a large allocation of computer memory is needed because of the requirement to download and store requisite java libraries and application content. Moreover, customers need a required software license even if they wish to simply view the process integration scenarios and had so far no possibility to view and develop process integration scenarios themselves on a mobile device.

SUMMARY

The present disclosure describes one or more general aspects involving devices, systems and methods for developing process integration scenarios on mobile devices.

One or more of the following innovative aspects of this disclosure can be embodied alone or in combination as methods that include the corresponding operations. One or more of the following innovative aspects of this disclosure can be implemented alone or in combination in a device comprising a processor, a processor-readable medium coupled to the processor having instructions stored thereon which, when executed by the processor, cause the processor to perform operations according to the one or more of the following aspects. One or more of the following innovative aspects of this disclosure can be implemented alone or in combination on a computer-readable medium having instructions stored thereon that, when executed by a processor, cause the processor to perform operations according to the one or more of the following aspects.

In aspect 1, a system for developing a process integration scenario on a mobile device comprises: a mobile application adapted to run on the mobile device and including: a scenario editor that is configured to edit a graphical element of the process integration scenario based on input received at a graphical user interface of the mobile device; a renderer that is configured to translate the graphical element into an industry standard language; a versioning module that is configured to generate an object version identifier that is associated with the process integration scenario; and the system further comprising: a local database configured to store the process integration scenario in the industry standard language and the object version identifier.

Aspect 2 according to aspect 1, wherein the process integration scenario associated with the graphical element being edited by the editor is retrieved from the local database and comprises at least one of the following scenario objects: application components, actions and connections, wherein the scenario object is associated with an object identifier and a version of the scenario object is associated with the object version identifier, and wherein the editing of the graphical element of the process integration scenario comprises creating, modifying or deleting the scenario object included in the scenario.

Aspect 3 according to any one of aspects 1 to 2, further comprising: a back-end server, wherein the mobile device is adapted to connect the mobile application to the back-end server and once the mobile application is connected to the back-end server the mobile application is further adapted to perform an outbound synchronization of the scenario object from the local database to the back-end server, wherein during the editing, translating and storing the mobile application can be disconnected from the back-end server.

In aspect 4, a system for developing a process integration scenario on a mobile device comprises: a mobile application adapted to run on the mobile device, the mobile application including: a scenario editor that is configured to edit a graphical element of the process integration scenario based on input received at a graphical user interface of the mobile device, wherein the scenario associated with the graphical element being edited by the editor is retrieved from a local database and comprises at least one of the following scenario objects: application components, actions and connections, wherein the scenario object is associated with an object identifier and a version of the scenario object is associated with an object version identifier, and wherein the editing of the graphical element of the scenario comprises creating, modifying or deleting the scenario object included in the scenario; a renderer that is configured to translate the graphical element into an industry standard language; a versioning module that is configured to generate a new object version identifier that is associated with the scenario object included in the scenario that is associated with the edited graphical element; and the system further comprising: a local database configured to store the process integration scenario in the industry standard language and the new object version identifier, wherein the mobile application is configured to connect to a back-end server after the storing of the scenario in the local database, and wherein the back-end server is configured to store the process integration scenario from the local database on a central database of the back-end server.

Aspect 5 according to any one of aspects 1 to 4, wherein the process integration scenario represents a business process between business components, the business components represent business partners, the actions represent process steps between the business partners and the connections represent channels between the actions configured for an exchange of electronic messages, and wherein the industry standard language is based on Web Services Business Process Execution Language, Business Process Model and Notation, or Web Services Description Language.

Aspect 6 according to any one of aspects 1 to 5, wherein during outbound synchronization a back-end server compares an object version identifier of a scenario object stored in a central database with the object version identifier of the scenario object stored in the local database, and wherein an administrator is provided with an option to select between the scenario object stored in the local database and the scenario object stored in the central database.

Aspect 7 according to any one of aspects 1 to 6, wherein if the scenario object stored in the local database is selected by an administrator (e.g., by a user of the mobile device), the scenario object is stored in a central database in the same industry standard language as it is stored in the local database and the scenario object is associated with a new object version identifier.

Aspect 8 according to any one of aspects 1 to 7, wherein before the scenario editor edits the graphical element of the process integration scenario a parser of the mobile application translates the scenario from the industry standard language into the graphical element and visualizes the graphical element at the graphical user interface.

Aspect 9 is any one of aspects 4 to 8, wherein during the editing, translating and storing the mobile application can be disconnected from the back-end server.

Aspect 10 according to any one of aspects 1 to 9, wherein when the local database stores the process integration scenario, the renderer translates the input on the graphical user interface into the industry standard language.

Aspect 11 according to any one of aspects 1 to 10, wherein the versioning module comprises a random number generator and a version synchronization controller, wherein the generator is configured to generate the object version identifier that identifies a version of the object, and wherein the controller is configured to compare object version identifiers.

Aspect 12 according to any one of aspects 1 to 11, further comprising a platform configured to connect the mobile application to a gateway server through a secured network connection.

Aspect 13 according to aspect 12, wherein the mobile application includes client libraries to enable the secured connection of the mobile application to the platform.

Aspect 14 according to any one of aspects 12 or 13, wherein the process integration scenario stored in the industry standard language in the local database is translated to open data protocol by the gateway.

While generally described as computer-implemented software embodied on tangible media that processes and transforms the respective data, some or all of the aspects may be computer-implemented methods or further included in respective systems or other devices for performing this described functionality. The details of these and other aspects, implementations or embodiments of the present disclosure are set forth in the accompanying drawings and the description below. Other features, aims, and advantages of the disclosure will be apparent from the description and drawings, and from the claims.

Figure 1:
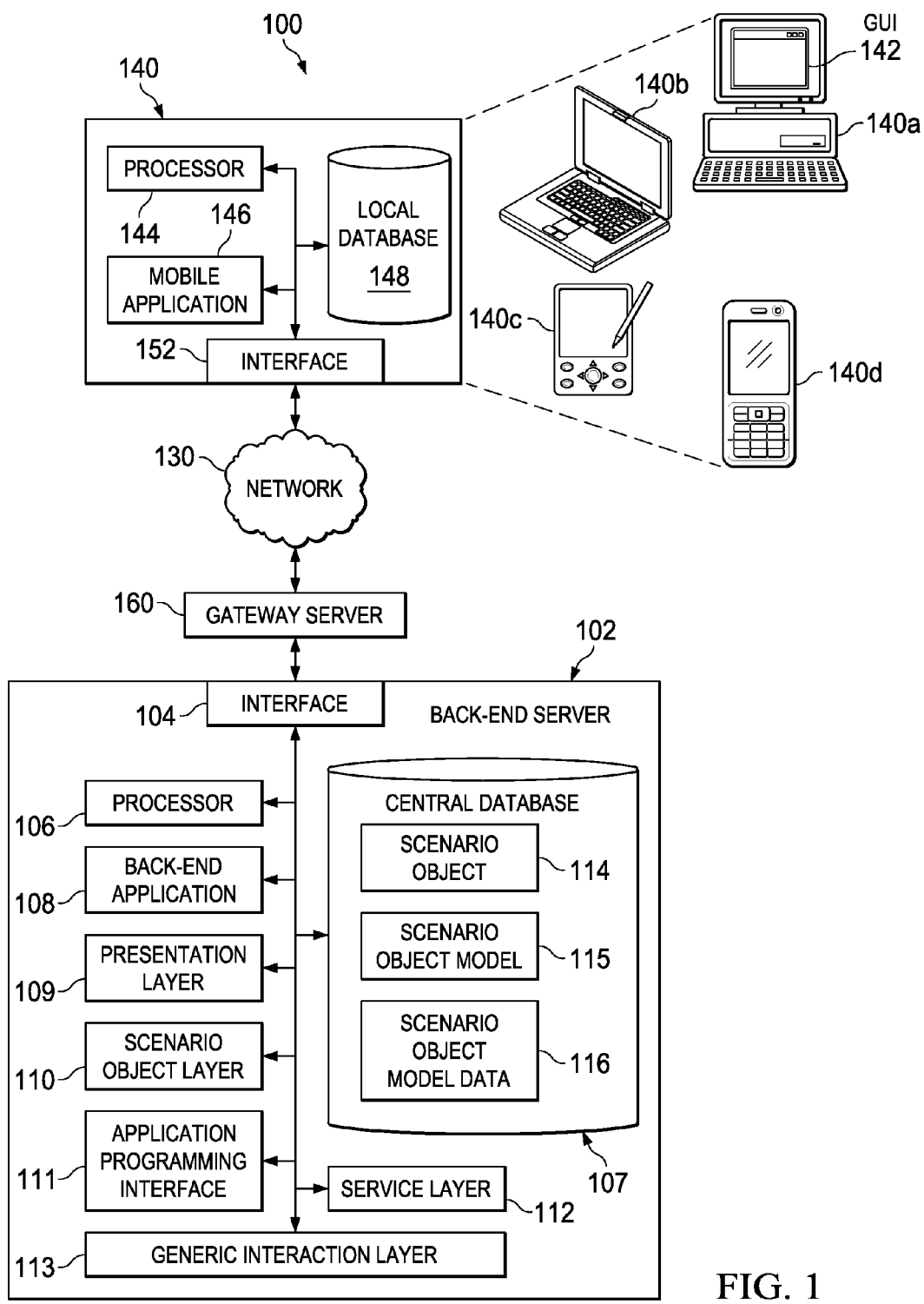
FIG. 1 illustrates an example distributed computing system for providing development of process integration scenarios on mobile devices.

Reference numbers and designations in the various drawings indicate exemplary aspects, implementations or embodiments of particular features of the present disclosure.

DETAILED DESCRIPTION

This disclosure generally relates to devices, systems, and methods for developing process integration scenarios on mobile devices. Specifically, tools and methods are described herein for providing a light-weight environment for developing process integration scenarios (such as, e.g., diagrams of business processes between business partners) on mobile devices, such as, e.g. tablet computers or smartphones.

The subject matter described in this disclosure can be implemented in particular aspects or embodiments so as to realize one or more of the following advantages.

First, a network-independent environment for the development of process integration scenarios on a mobile device may be provided. For example, a mobile application installed on the mobile device may allow a user of the mobile device to visualize, develop and store the process integration scenarios without an online connection of the mobile device to a back-end server in a network environment (e.g., to an ESR server). This may lower the barrier for the development of process integration scenarios and extends the development of the scenarios to the mobile area of application.

Second, a light-weight development environment configured to develop process integration scenarios in a mobile application installed on a mobile device may provide a simple and intuitive graphical notation of business processes for a user of the device. For example, the user may be provided with a needful number of options to develop the process integration scenarios on her or his own demand and may adapt them taking into account particular boundary conditions for the scenarios (e.g., user preferences, regulations in countries, fiscal laws, requirements by particular industries or specifics of business partners and/or business processes).

Third, a network-independent, mobile application for the development of process integration scenarios may allow reducing the total cost of ownership (TCO). For example, process integration scenarios may be easily optimized within individual companies before establishing a combat-ready version of the scenarios for all involved business partners. For example, an employee may walk through a company and take specific requirements of individual units (e.g., business components) within the company as well as feedback into account for a process integration scenario, before the scenario is completed and stored in a central database of a back-end server (e.g., an ESR server). During development of the scenario, the mobile device may not need to be connected to the back-end server by a network connection. This may circumvent the necessity to establish several terminals with client-server connections within a company and may make the development of scenarios less costly, more efficient and/or more flexible.

Fourth, a light-weight development environment configured to translate graphical elements of process integration scenarios into industry standard language on a mobile device may be applied for various kinds of business processes and business partners, independent from the specifics of the processes and the business partners. Furthermore, such a development environment may be employed on various kinds of mobile devices (e.g., with a touch-sensitive graphical user interface) and operating systems while keeping its fundamental architecture.

Fifth, the mobile application for the development of process integration scenarios may allow sales people to demonstrate process integration scenarios and the development thereof to new customers, although the new customers do not yet have a license for the client-server application (e.g. ESR)

Other advantages of this disclosure will be apparent to those skilled in the art.

For the purposes of this disclosure, a process integration scenario is a bundle of business processes that provides integration of information, collaboration tools, data flow, industry-specific functionality and scalability. The scenario provides a delivery of end-to-end business processes which span organizational boundaries such as business departments and locations, integrates business partners such as companies, customers, suppliers, and service providers, and allows an organization to align business plans, budgets, and operational reports. The process integration scenario may present information from diverse sources in a unified and structured way, and provide additional services, such as dashboards, a search engine, e-mail, news, navigation tools, and various other features. The process integration scenario is often used by enterprises to provide their employees, customers, and possibly additional users with a consistent appearance, access control and procedures for multiple applications, which otherwise would have been separate entities altogether. In this and other ways, synergies may be achieved.

Generally, through a graphical user interface (GUI), a scenario user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the process integration scenario user. These and other UI elements may be related to or represent the functions of the web browser.

FIG. 1 illustrates an example distributed computing system 100 operable to provide development of process integration scenarios on mobile devices according to one aspect of the disclosure. Specifically, the illustrated example distributed computing system 100 includes or is communicably coupled with a back-end server 102 (e.g., an ESR server) and a mobile device 140 which may communicate across a network 130.

In general, the back-end server 102 is a server that stores one or more back-end applications 108 (e.g., an ESR application, an enterprise resource planning (ERP) application, etc.), where at least a portion of the back-end applications 108 are executed via requests and responses sent to users or clients within and communicably coupled to the illustrated example distributed computing system 100. In some implementations, the back-end server 102 may store a plurality of various back-end applications 108. In other implementations, the back-end server 102 may be a dedicated server meant to store and execute only a single back-end application 108. In some implementations, the back-end server 102 may comprise a web server, where the back-end applications 108 represent one or more web-based applications accessed and executed by the mobile device 140 via the network 130 or directly at the back-end server 102 to perform programmed tasks or operations of the back-end application 108.

At a high level, the back-end server 102 comprises an electronic computing device operable to receive, transmit, process, store, or manage data and information associated with the example distributed computing system 100. Specifically, the back-end server 102 illustrated in FIG. 1 is responsible for receiving application requests, for example scenario navigation requests, from one or more mobile applications 146 associated with the mobile device 140 of the example distributed computing system 100 and responding to the received requests by processing said requests in the associated back-end application 108, and sending the appropriate response from the back-end application 108 back to the requesting mobile application 146. In addition to requests from the mobile device 140, requests associated with the back-end applications 108 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single back-end server 102, environment 100 can be implemented using two or more servers 102, as well as computers other than servers, including a server pool. Indeed, back-end server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated back-end server 102 may be adapted to execute any operating system, including Linux, UNIX, Windows, Mac OS, Java, Android, iOS or any other suitable operating system. According to one implementation, back-end server 102 may also include or be communicably coupled with an e-mail server, a web server, a caching server, a streaming data server, and/or other suitable server.

The back-end server 102 also includes an interface 104, a processor 106, and a central database 107. The interface 104 is used by the back-end server 102 for communicating with other systems in a distributed environment—including within the environment 100—connected to the network 130; for example, the mobile device 140, as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

As illustrated in FIG. 1, the back-end server 102 includes a processor 106. Although illustrated as a single processor 106 in FIG. 1, two or more processors may be used according to particular needs, desires, or particular implementations of the environment 100. Each processor 106 may be a central processing unit (CPU), a blade, an application specific integrated circuit (ASIC), a field-programmable gate array (FPGA), or another suitable component. Generally, the processor 106 executes instructions and manipulates data to perform the operations of the back-end server 102. Specifically, the processor 106 executes the functionality required to receive and respond to requests from the mobile device 140 and/or allowing providing development of process integration scenarios on mobile device 140.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Objective C, Java, Visual Basic, assembler, Perl, any suitable version of 4GL, industry standard language, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The back-end server 102 also includes the central database 107, or multiple central databases 107. The central database 107 may include any type of memory or database module and may take the form of volatile and/or non-volatile memory including, without limitation, magnetic media, optical media, random access memory (RAM), read-only memory (ROM), removable media, or any other suitable local or remote memory component. The central database 107 may store various objects or data, including caches, classes, frameworks, applications, backup data, jobs, web pages, web page templates, scenario objects in industry standard language, database tables, repositories storing business and/or dynamic information, and any other appropriate information including any parameters, variables, algorithms, instructions, rules, constraints, or references thereto associated with the purposes of the back-end server 102. Additionally, the central database 107 may include any other appropriate data, such as VPN applications, firmware logs and policies, firewall policies, a security or access log, print or other reporting files, as well as others. While central database 107 is illustrated as in integral component of the back-end server 102, in alternative aspect or implementation central database 107 can be external to the back-end server 102 and/or the example distributed computing system 100.

The back-end server 102 further includes an application programming interface (API) 111. The API 111 may include specifications for routines, data structures, and object classes. The API 111 may be either computer language independent or dependent and refer to a complete interface, a single function, or even a set of APIs. In some implementations, the API 111 can be used to interface between the back-end application 108 and/or one or more components of the back-end server or other components of the example distributed computing system 100, both hardware and software. For example, in one implementation, the back-end application 108 can utilize API 111 to communicate with the mobile device 140. Although the API 111 is shown as a stand-alone component within the back-end server 102, there may be multiple other APIs in the example distributed computing system 100 that are integrated into or accessible by individual components, both hardware and software. The back-end server 102 (e.g., an ESR server) may be based on a Java platform and/or the back-end application may be based on a Java runtime environment.

The service layer 112 provides software services to the example distributed computing system 100. The functionality of the back-end server may be accessible for all service consumers via this service layer. Software services, such as scenario navigation, provide reusable, defined business functionalities through a defined interface. The defined interface may be software written in extensible markup language (XML) or other suitable language. While illustrated as an integrated component of the back-end server 102 in the example distributed computing system 100, alternative implementations may illustrate the service layer 112 as a stand-alone component in relation to other components of the example distributed computing system 100. Moreover, any or all parts of the service layer 112 may be implemented as child or sub-modules of another software module or enterprise application (not illustrated) or of another hardware module (not illustrated) without departing from the scope of this disclosure.

The central database 107, i.e., a back-end data system, holds data for the back-end server 102. In some implementations, the central database 107 includes a scenario object 114, a scenario object model 115, and scenario object model data or metadata 116. Although illustrated as single instances, there may be more than one instance of the scenario object 114, scenario object model 115, and scenario object model data 116.

The scenario object 114 can be considered a representation of an intelligible business/non-business entity, such as an account, an order, an employee, an invoice, a financial report, etc. The scenario object 114 may encompass both functions, for example in the form of methods, and data, such as one or more properties. For example, an account scenario object 114 may have properties such as Name, Priority, Value, etc. Scenario objects 114 may reduce system complexity by reducing a system into smaller units.

The implementation details of scenario objects 114 are typically hidden from a non-development user and may be accessed through the defined functions and encapsulated data. Scenario objects 114 also form a point of entry of the functions and data of a system and enable the system to easily share, communicate, display, or otherwise operate with other systems. A scenario object 114 may also be considered the target of a request for data in a particular process integration scenario, for example through a web page, and may contain a view to be displayed when the scenario object 114 is accessed. In some implementations, the scenario object 114 can control the location of a selected view, personalized views for a specific scenario user, and dynamic views. While illustrated as integrated with central database 107 of the back-end server 102 in the example distributed computing system 100, in alternative implementations the scenario object 114 can be stored external to the back-end server 102 and/or the mobile device 140.

ESR, as the environment for scenario objects, may provide CRUD (create, read, update, delete) operations for a plurality of the following objects: action, integrations process, monitoring process, step group, alert category, model, object definition, service interface, message type, fault message type, data type, data type enhancement, external definition, context object, business object, business object enhancement, agent, user interface text object, process component, operating mapping, message mapping function library, mapping template, imported archive, adapter metadata, communication channel template, change list, software component version, folder, namespace, usage profile, and connections.

The scenario object model 115 is a structured way of representing relationships, associations, roles, etc. of scenario objects 114 applicable to an organization. For example, the scenario object model may be represented through the use of an entity-relationship diagram (ERD) or other suitable diagram or descriptive method. An example a scenario object model 115 for ProductSeller may include root scenario objects 114 such as Account and Order, each of which may contain their own methods, properties, and relationships to other dependent scenario objects in the scenario object model 115. The root scenario objects 114 may also have associations with other dependent scenario objects 114. Examples of a dependent object for the Account root scenario object 114 may include AccountAddressUS. Example dependent scenario objects for the Order rood scenario object 114 may include OrderPartner and OrderItemShipmentData. While illustrated as integrated with central database 107 of the back-end server 102 in the example distributed computing system 100, in alternative implementations the scenario object model 115 can be stored external to the back-end server 102.

The scenario object model data 116 is data and/or metadata associated with a specific instance of a scenario object 114. For example, for the example AccountAddressUS dependent object above, there may be properties Name, Title, Address1, Address2, City, State, and PostalCode. Scenario object data 116 would be the data associated with each property, for example, Name="XYZ, Inc.", Address1="12345 Any Street", Address2="Suite ABC", City="Some City", etc. In some implementations, the scenario object 114 or scenario object model data 116 may include, among other things: text, images, sounds, videos, and/or animations. While illustrated as integrated with central database 107 of the back-end server 102 in the example distributed computing system 100, in alternative implementations the scenario object model data 116 can be stored external to the back-end server 102 and/or the mobile device 140.

Access to the back-end server 102 may be provided through the mobile device 140, for example a web browser or other suitable GUI 142 application interfacing with the user interface (UI) presentation layer 109 that further interfaces with the application programming interface 111 provided by a scenario object layer 110. The scenario object layer 110 provides a consistent interface for a GUI application to access scenario objects 114 associated with the back-end application 108. Associated with the scenario object layer 110 is a generic interaction generic interaction layer 113 which provides a consistent interface for the scenario object layer 110 to access back-end application 108 scenario objects 114 through APIs 111 and for the back-end application 108 to return data to the mobile device 140. At a high-level, generic interaction layer 113 may act as a bridge between the mobile device 140 and the back-end application 108. Because of this architecture, the mobile device 140 may not affected by changes to the underlying back-end application 108 as long as the scenario object layer 110, generic interaction layer 113 or APIs 111 interface(s) does not change. This architecture also may ensure that changes to a particular layer, API, etc. can also be isolated from affecting other layers, APIs, etc.

Mobile devices 140 may access the back-end server 102 through the gateway server 160. The gateway server 160 provides a defined API and acts as an interface or gateway between a mobile device 140 and the back-end server 102. In some implementations, the gateway server 160 can communicate with mobile device 140 using Open Data (OData) protocol through hypertext transfer protocol (HTTP) or hypertext transfer protocol secure (HTTPS) requests. In some implementations, the gateway server 160 can use a remote function call (RFC) interface to communication with advanced business application programming (ABAP) language and/or non-ABAP programs. In some implementations, the gateway server 160 can be stand-alone. In some implementations, the gateway server 160 can be incorporated into any component of the example distributed computing system 100. In some implementations the gateway server 160 may be a hardware server, a software server, and/or a virtual server. In some implementations, the gateway server 160 can be part of a web server, a streaming server, an RSS server, or other suitable server.

The gateway server 160 may be combined with Sybase technology. On the mobile device 140 Sybase client libraries may be installed that are configured to manage a connectivity of the mobile device to a Sybase Unwired Platform (SUP) in between and communicatively coupled to the Sybase client libraries and the gateway server 160. The SUP may provide administrative functionality like security, onboarding, user authentication etc. On SUP the mobile device 140 may have to be registered before. In case the SUP identifies the mobile device 140 as a trusted client, the connection to the back-end server 102 via the gateway server 160 may be established. The data between the mobile device 140 and the SUP may be transferred in OData protocol, wherein the gateway server 160 transforms the data stream in OData protocol to other data protocols (e.g., XML). The gateway server 160 may serve as a central hub for several back-end servers. The data stream may be stored in industry standard language (e.g., WS-BPEL) on the central database 170 of the one or more back-end servers 102.

The illustrated mobile device 140 further includes a processor 144, a local database 148, an interface 152 and a mobile application 146. In a general aspect, the mobile device 140a-d may be a tablet computer, a smartphone, a cell phone, a personal digital assistant (PDA), an e-book reader, a laptop or desktop computer or similar mobile computing devices. The mobile application 146 allows the mobile device 140 to request and view content on the mobile device 140. In some implementations, the mobile application 146 can be and/or include a web browser. In some implementations, the mobile application 146 can use parameters, metadata, and other information received at launch to access a particular set of data from the server 102. Once a particular mobile application 146 is launched, a user can interactively process a task, event, or other information which may be associated with the back-end server 102. Further, although illustrated as a single mobile application 146, the mobile application 146 may be implemented as multiple mobile applications in the mobile device 140.

Figure 2A:
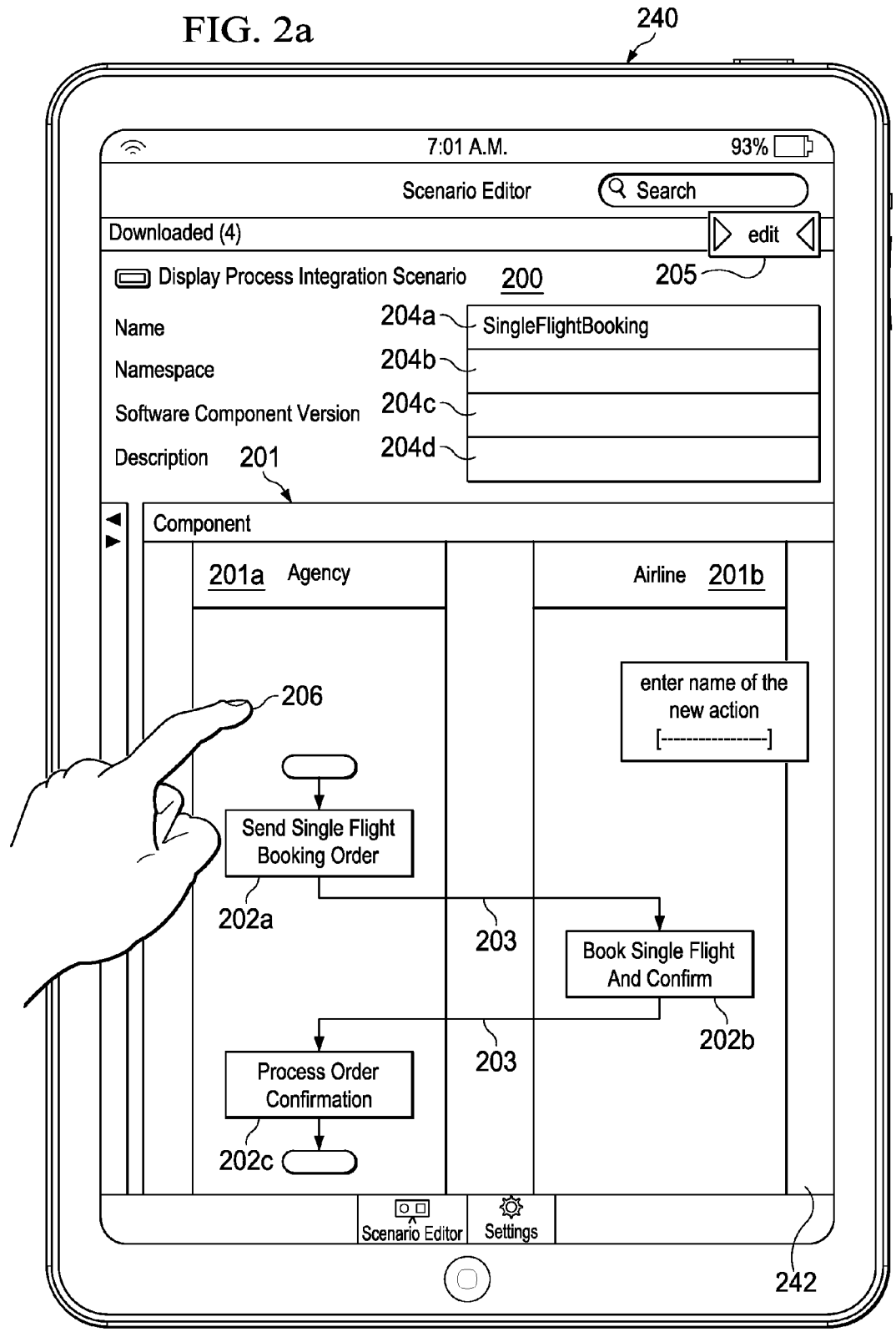
FIG. 2a is an example for visualizing a process integration scenario on a mobile device.

Turning now to FIG. 2. FIG. 2a is an example according to one aspect for visualizing a process integration scenario 200 on a mobile device 240, such as a tablet computer. For example, the process integration scenario 200 may be displayed as graphical elements 201, 202, 203, 204 via a graphical user interface (GUI) 242 of the mobile device 240. In this particular example of FIG. 2a, the process integration scenario 200 is a diagram of a process flow to book a flight. The particular scenario 200 comprises three scenario objects: business components 201, actions 202 and connections 203. In a general aspect, the business components 201 represent business partners, the actions 202 represent process steps between the business components 201 and the connections 203 represent channels between the actions 202 configured to exchange electronic messages (such as, e.g., Email, EDI, IDocs or Web Services). For instance, the actions 202 may be distributed among different business components. For example, some of the actions 202 may be associated to different companies, e.g., that are domiciled at different physical locations.

In this particular example, business components may be a travel agency 201a and an airline 201b. Furthermore, actions 202 may be several process steps 202a-c associated with the scenario 200, e.g. with the booking of a flight. Connections 203 may represent an exchange of emails or other kinds of electronic messages. In this particular example, the agency 201a sends via connection 203 a single flight booking order 202a to the airline 201b, which in turn books the single flight 202b and confirms the order by sending via connection 203 an order confirmation to the agency 201a, which in response processes the confirmation 202c.

The process integration scenario may comprise one or more details 204a-d associated with the scenario 200, which may be displayed via the GUI 242 on the mobile device 240. Scenario details 204a-d may comprise a name 204a of the scenario, a physical or logical storage location 204b of the scenario data and/or metadata, a version 204c of the software (e.g. a version of the scenario 200) or a description 204d of the content of the scenario 200. A user of the mobile device 240 may be able to use a pointer 206 (e.g., a finger, a mouse, a stylus or a scrolling object) to navigate within the scenario 200. The GUI 242 may provide an icon 205 which enables the user to develop (i.e., edit; e.g., create, edit, modify, change, update or delete) the process integration scenario 200. For example, upon the user activating the icon with a pointer 206 (e.g., by the user touching the icon with an object or by clicking on the icon by a mouse pointer), the user is provided with an option to edit (e.g., create, modify or delete) at least one of business components, actions or connections of the scenario 200.

Figure 2B:
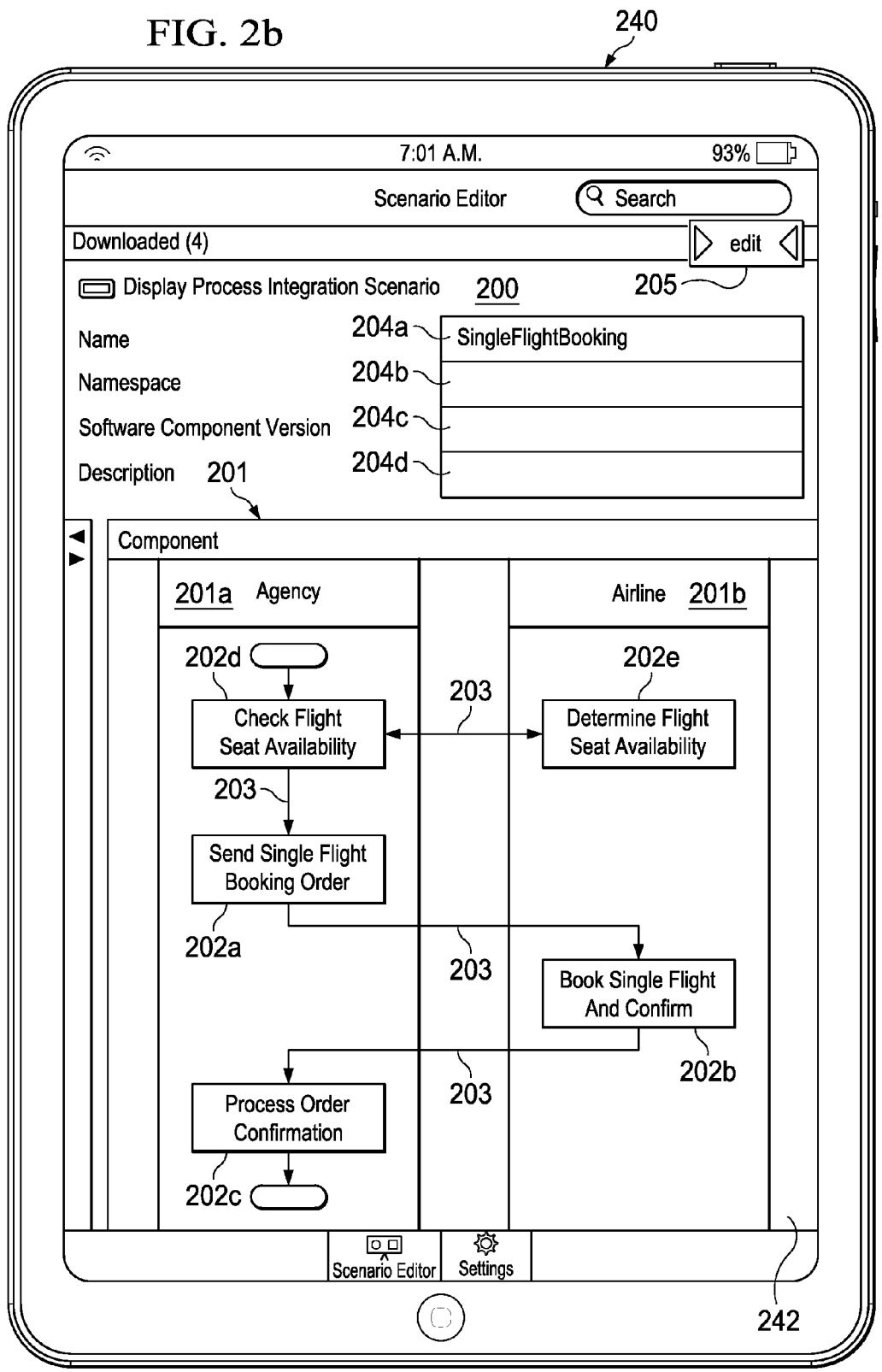
FIG. 2b is an example for developing a process integration scenario on a mobile device.

FIG. 2b illustrates an exemplary development of the process integration scenario 200 on the mobile device 240 according to one aspect. The user of the mobile device 240 may like to extend the scenario 200 (here, e.g., the scenario to book a flight) with a technical availability-check step 202d. The user may, e.g., click on an empty space in the agency business component 201a and a new action (e.g., process step) is created. This new process step may be displayed by the GUI 242 as a graphical element 202d. After creating the action for check flight availability on the agency side, another new action for determining flight check availability is created by the user in a similar manner on the airline side. Connecting 203 both new actions by drag and relate leads to an enhanced process integration scenario 200. The developed scenario 200 in this aspect then starts with a check of flight seat availability 202d by the agency 201a and determining the flight seat availability 202e by the airline 201b. This is followed by sending 203 a single flight booking order 202a by the agency 201a to the airline 201b, where, in response, the single flight is booked 202b and a confirmation is sent 203 by the airline 201b to the agency 201a, where, upon receiving, the order confirmation is processed 202c. In this example, the process integration scenario 200 allows to integrate process steps associated with flight booking, which take play between the travel agency 201a and the airline 201b, in an intuitive manner on the mobile device 140 and on a user's demand.

In an aspect, FIG. 2b shows that a user may develop, e.g. edit, at least one of business components 201, actions 202 or connections 203 of a process integration scenario 200. The user may view or edit the details 204 of the scenario 200. For example, the user may create (or add), delete or modify actions 202 of the scenario 200 and/or the user may create, delete or modify connections 203 between two or more actions 202 of the scenario 200. For instance, the user may create, delete or modify business components 201 of the scenario 200. For example, the user may use a finger to touch certain locations of the GUI 242 that are associated with business components 201, actions 202 or connections 203 and may drag the scenario object to another location within the scenario 200. For example, the user may drag an action 202 from one business component 201 to another business component 201 or the user may drag a line between two actions 202 to connect 203 the actions 202. Furthermore, the user may reverse the direction of message exchange of a connection 203 or allow en exchange of electronic messages in both directions between the actions 202. As in this particular light-weight development environment only a limited number of scenario objects (e.g., business components, actions or connections) reduced to the needful is incorporated into the scenario 200, the GUI 242 is enabled to provide a light-weight development of the process integration scenario 200 to the user of the mobile device 240. This may provide a simple and intuitive graphical view of business processes to the user of the mobile device 240. For example, the user may be provided with a needful number of options to develop process integration scenarios 200 on her or his own demand and may adapt them taking into account particular boundary conditions for the scenarios (e.g., user preferences, regulations in countries, fiscal laws, requirements by particular industries or specifics of business partners and/or business processes).

Figure 3:
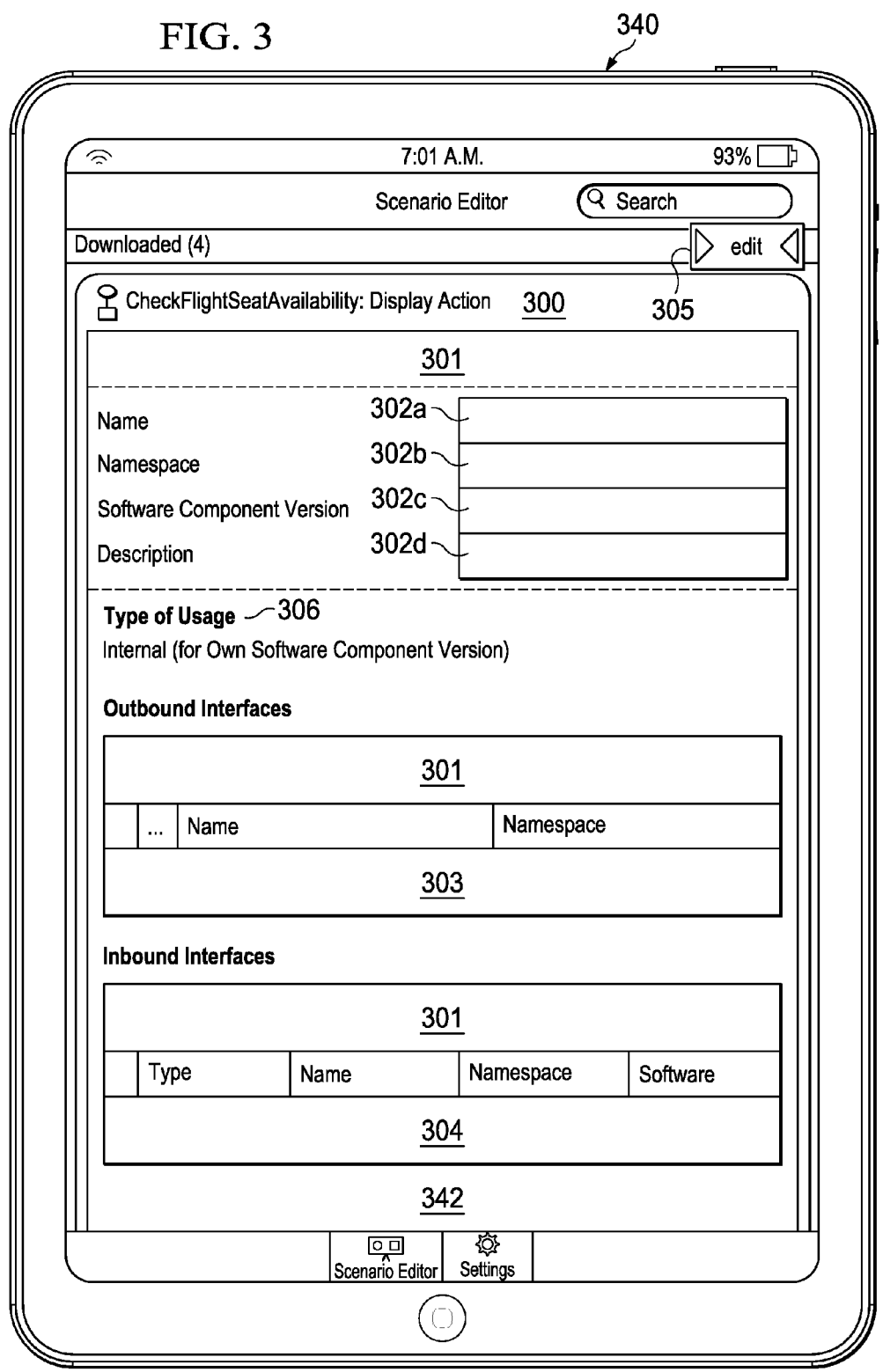
FIG. 3 is an example for editing details of an edited process step of a process integration scenario that is developed on a mobile device.

FIG. 3 illustrates an example according to one aspect for editing details of an edited scenario object of a process integration scenario that is developed on a mobile device 140. A GUI 342 of a mobile device 340 provides a user of the device 340 with details 300 of an action 202 of the process integration scenario 200 and with an option to edit the details, e.g. via activation of an icon 305 provided in the GUI 342. For example, the action 202 may be an edited action 202 (e.g., a created or modified process step). In this particular example, the action 202 is the newly created check flight seat availability action 202d described in FIG. 2b. In general, the details 300 of the scenario object may comprise a name 302a, a physical location of action data and/or metadata 302b, a version 302c of the edited scenario object, a description 302d, outbound interfaces 303, inbound interfaces 304, type of usage 306 (e.g., internal or external usage) and/or one or more icons 301, wherein the icons 301 may comprise navigational icons to navigate on the GUI 142 and/or input fields (e.g., a mask to input a search query that is searched within the mobile device, e.g. within the listed interfaces or the within the scenario objects, or within an external database by a server connected to the mobile device).

For example, upon the user touching a location associated with an action 202 described in FIG. 2a/b, a graphical view opens on the GUI 142 providing the user with details 300 of the action 202 further specifying particular parameters of the action and its connections 203 to other actions 202. In a similar manner, a user may edit details 300 of a connection 203, e.g., by touching the connection on the GUI 342. For example, upon a user activating a connection between actions, a graphical view opens on the GUI 342 that allows the user to edit channels for electronic messages between actions 202 and/or mapping programs.

In general, having finalized changes of the scenario 200, the scenario objects may be stored in a database, e.g. a local database of the mobile device 340. When the local database is connected (e.g., via the mobile device 340) to a network, the developed process integration scenario and its scenario objects (e.g., business components 201, actions 202 or connections 203) may be stored in a central database (e.g., a ESR database), which may be connected to the same network.

Figure 4A:
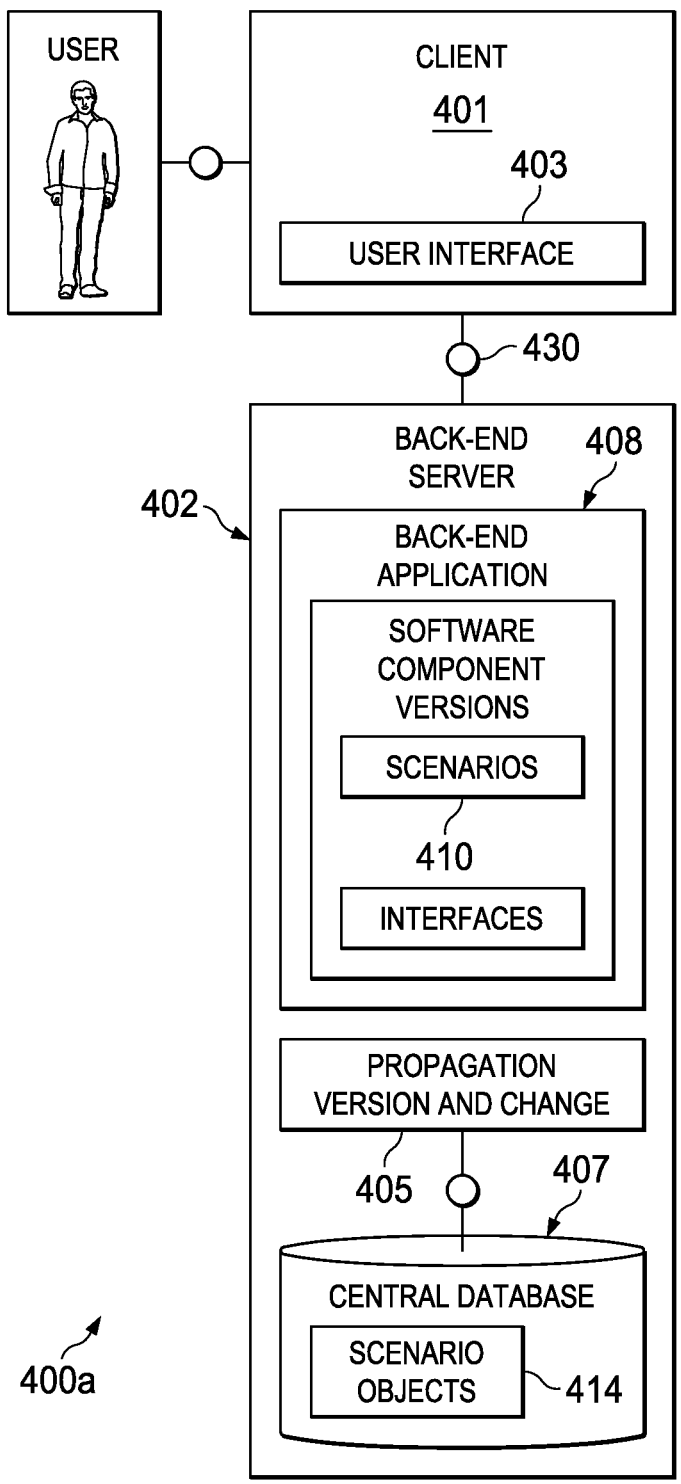
FIG. 4a illustrates a high-level architecture of a client-server application, e.g. Enterprise Services Repository (ESR).

FIG. 4a illustrates a high-level architecture of a client-server application 400a, e.g. of Enterprise Services Repository (ESR). Process integration scenarios 410 may be bundled together with service interfaces and other ESR content object types in software components of a particular version called software component versions (SWCV). When a user of a client 401 has a back-end server 402, such as an ESR server, in her or his system landscape, scenario objects 414 of the process integration scenarios 410 are stored along with an installation of SWCV in a central database 407 of the back-end server 402. The scenario objects 414 may be accessed via a client 401.

A development of the process integration scenarios 410, service interfaces and objects takes place in the back-end application 408 of the back-end server 402 (e.g., an ESR server). Metadata of the process integration scenarios 410 may be stored in the central database 407 in an industry standard language WS-BPEL, which may be based on XML notations. When stored on the central database 407 for the first time, a scenario object 414 receives or is associated with an object identifier and an initial object version identifier associated to the scenario object 414. An editing of the scenario object 414 may lead to a new object version identifier, whereas the object identifier remains the same. For example, each editing (e.g., modifying, creating, deleting or updating) of a scenario object 414 may lead to a new object version identifier while the object identifier remains the same. A propagation version and change (PVC) component 405 may be Java-based, and generally manages the versioning concept of the scenario objects 414. This PVC component 405 stores current and former object version identifiers of the scenario objects 414, e.g. in a history graph, and handles conflicts in case scenario objects 414 have been concurrently or previously edited in different back-end applications 408 prior to cross-transport back to the back-end server 402.

Scenario objects 414 stored in the central database 407 may be accessed through a user interface 403 of the client 401. The user interface may be Java-based and/or may be a Java swing client of the ESR. The user interface 403 calls the back-end application 408 (e.g., an ESR application) of the back-end server 402 and the application 408 may perform CRUD (create, read, update, delete) operations on one or more of the scenario objects 414. In this aspect, the user needs a license for software packages installed on the back-end server 402 (e.g., the ESR server) and the client needs an online connection 430 to the back-end server 402 in the client-server application architecture 400a.

Figure 4B:
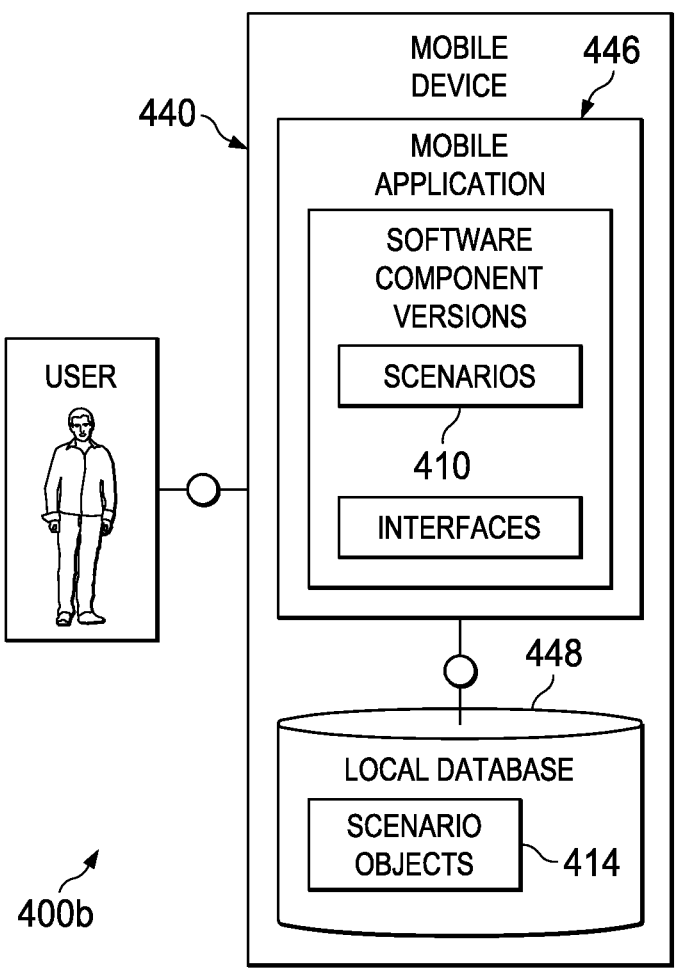
FIG. 4b illustrates a high-level architecture of a network-independent development environment for process integration scenarios on a mobile device.

FIG. 4b illustrates a high-level architecture of a network-independent development environment 400b for process integration scenarios 410 on a mobile device 440 according to one aspect. The mobile device 440 may comprise a mobile application 446 (e.g., with an adapted version of SWCV installed within the mobile application 446) and a local database 448. Scenario objects 414 included in the scenarios 410 may be stored in the local database 448. The scenario objects 414 may comprise at least one of business components, actions and connections. For example, in one aspect the scenario objects 414 included in the scenarios 410 may consist of business components, actions and connections thereby allowing for a light-weight development environment applicable to mobile devices 440.

In the example of FIG. 4b, the number of types of scenario objects 414 may be limited to the needful (e.g. the number is reduced compared to the number of types of scenario objects in the central database 407 of the back-end server 402) to be able to be accessed and developed on the mobile device 440 by the mobile application 446. This provides a user with an option to develop (e.g., edit) the process integration scenarios 410 on her or his demand and to adapt them to specific requirements or boundary conditions. Furthermore, in the example of FIG. 4b, the network-independent environment for the development of the process integration scenarios 410 on the mobile device 440 may allow the user of the mobile device 440 to visualize, develop (e.g., edit) and store the process integration scenarios 410 without a current online connection 430 of the mobile device 440 to a back-end server 402 (e.g., to an ESR server) in difference to the exemplary client-server application architecture 400a in FIG. 4a. Particular aspects or implementations described herein may lower the barrier for the development of process integration scenarios and extends the development of the scenarios to the mobile area of application. Particular aspects or implementations described herein may allow sales people to demonstrate process integration scenarios and the development thereof to new customers, although the new customers do not yet have a license for the client-server application (e.g. ESR) or a license for the content, i.e. the SWCVs where the scenarios are part of.

For applying the development of process integration scenarios 410 to the mobile area of application, it may not be practicable to rebuild the whole functionality of the back-end application 402, the PVC component 405 and/or the scenario objects 414. The mobile devices 440 may require a light-weight development environment for the scenarios 410.

Figure 5:
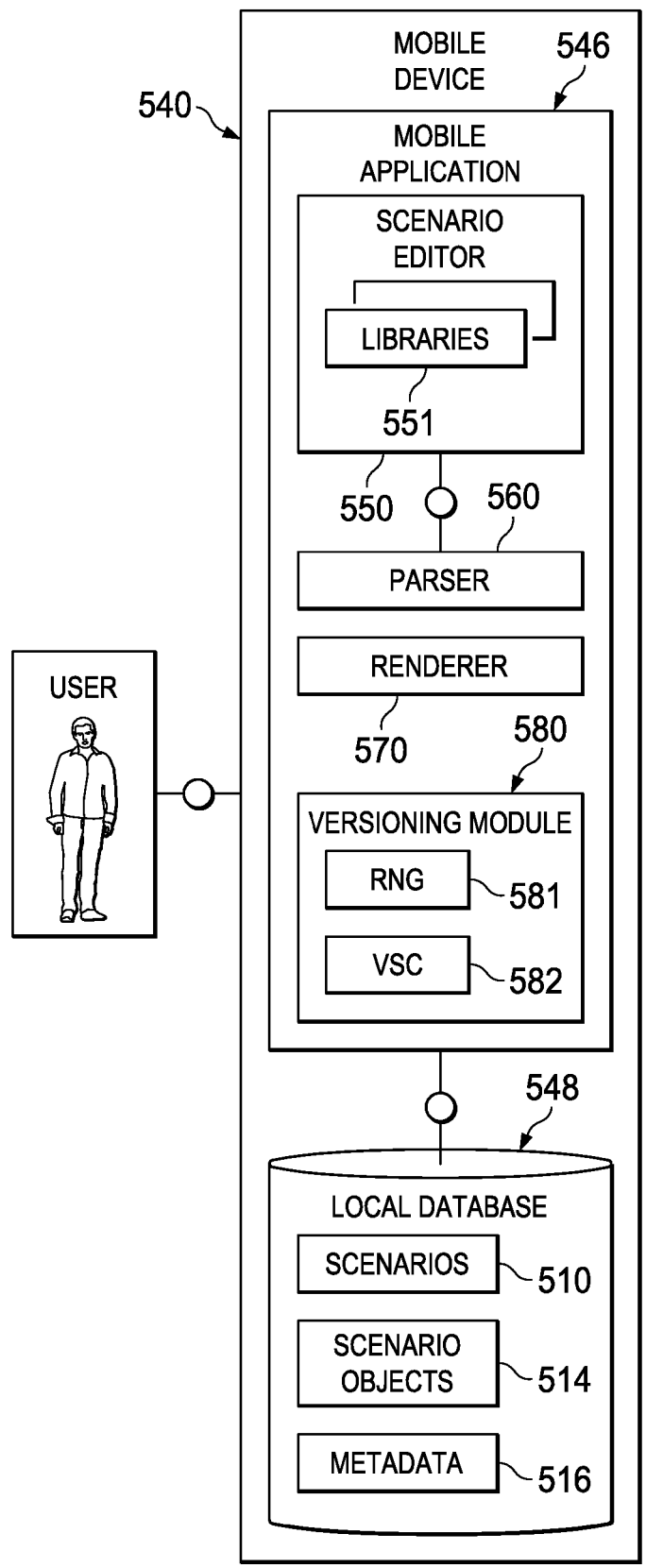
FIG. 5 illustrates a detailed architecture of a light-weight development environment for process integration scenarios on a mobile device.

FIG. 5 describes an example architecture of a light-weight development environment for process integration scenarios 510 on a mobile device 540. The mobile device 540 (e.g. a tablet computing device) may comprise a mobile application 546 and a local database 548. In one aspect, the mobile application 546 may comprise a scenario editor 550, a parser 560, a renderer 570 and a versioning module 580. In another aspect, the mobile application 546 may comprise a scenario editor 550, a renderer 570 and a versioning module 580, but may not include a parser 560. In another general aspect, the local database 548 may be a memory connected to the mobile device 540 (e.g. an USB stick or an external hard drive).

In a general aspect, the mobile application 546 may comprise the scenario editor 550 that may provide a light-weight development environment for the process integration scenarios 510. The scenario editor 550 may provide CRUD (e.g., create, read, update, or delete) operations. These operations use functionalities provided by libraries 551, which may be a part of mobile device-specific software development kits (SDK). These libraries give access to metadata 516 stored in the local database 548. The scenarios 510 may be visualized (e.g., read) by the parser 560, e.g. in form of graphical elements, on a graphical user interface (GUI) of the mobile device 540. The parser 560 may visualize the scenario objects 514 by transforming the metadata 516 stored in the local database 548 into graphical elements. For example, the parser may transform metadata 516 from industry standard language (e.g., WS-BPEL) files into graphical elements. For instance, the parser 560 may use functionality that is part of the libraries 551 (e.g., SDK libraries). For example, before the scenario editor 550 edits the graphical elements of the process integration scenarios 510, the parser 560 translates the scenario 510 from an industry standard language into the graphical elements and visualizes the graphical elements at the graphical user interface of the mobile device 540.

Editing scenario objects 514 on the graphical user interface of the mobile device 540 may be require the user to switch from a visualization view to an edit view (e.g., the scenario editor 550) by activating an edit mode (e.g., by the user clicking or touching an edit button, e.g. that is a part of the mobile application 546, on the graphical user interface). For instance, the scenario objects may be edited, for example, modified (e.g., update operation), removed (e.g., delete operation) or created from scratch (e.g., create operation). For example, the scenario editor 550 is configured to edit a graphical element of the process integration scenario 510 based on input (e.g., by a user) received at the graphical user interface of the mobile device 540. Particular aspects or implementations described herein may provide a light-weight development environment configured to translate the graphical elements of process integration scenarios 510 into industry standard language on the mobile device 540 and may thereby be applied to various kinds of business processes and business partners, independent from the specifics of the processes and the business partners. Furthermore, such a development environment may be employed on various kinds of mobile devices 540 and operating systems while keeping its fundamental architecture.

In a general aspect, the renderer 570 translates the input on the graphical user interface into industry standard language (e.g., WS-BPEL). For example, the renderer 570 translates the input on the graphical user interface into industry standard language (e.g., WS-BPEL) when the process integration scenario 510 is saved in the local database 548. For example, when saving the created, modified or deleted scenario objects 514 in the local database 548, the renderer 570 transforms the input on the graphical user interface (e.g., on a screen of the mobile device 540) into an industry standard language (e.g., into an industry standard language data stream or file, such as a WS-BPEL-specific data stream or file). The local database 548 may store the process integration scenario 510 in the industry standard language. For instance, the renderer 570 may use functionalities that are part of the libraries 551 (e.g., SDK libraries) of the mobile device 540.

In a general aspect, the process integration scenario 510 associated with the graphical element that is being edited by the editor is retrieved from the local database 548 and comprises at least one of the following scenario objects 514: application components, actions and connections, wherein the scenario object 514 is associated with an object identifier and a version of the scenario object is associated with an object version identifier, and wherein the editing of the graphical element of the process integration scenario 510 comprises creating, modifying or deleting the scenario object 514 included in the scenario 510.

In a general aspect, the process integration scenario 510 represents a business process between business components, the business components represent business partners, the actions represent process steps between the business partners and the connections represent channels between the actions configured for an exchange of electronic messages, and wherein the industry standard language is equal to or based on Web Services Business Process Execution Language (WS-BPEL) or Business Process Model and Notation (BPMN)

In a general aspect, storing data on the local database 548 requires an additional component for versioning. The versioning module 580 may be configured to manage versions of the scenario objects 514 that are stored in the local database 548 or a central database 107, 407 of a back-end server 102, 402 (e.g., an ESR server). The versioning module 580 comprises a random number generator (RNG) 581 and/or a version synchronization controller (VSC) 582. For example, the versioning module 580 is configured to generate an object version identifier (e.g., a new object version identifier) that is associated with the process integration scenario 510.

For instance, the versioning module 580 may change an object version identifier associated with a scenario object 514 being edited by the scenario editor 550. For example, the scenario editor 550 may retrieve a scenario 510 from the local database 548 and one or more scenario objects 514 that are included in the scenario 510, the editor 550 may edit one or more graphical elements associated with the scenario object 514 and after the editing of the graphical element associated with the scenario object 514, the renderer 570 may translate the graphical element into an industry standard language and the versioning module may associate an object version identifier (e.g., that replaces a former object version identifier associated with the scenario object 514) to the scenario object 514. For example, the object version identifier may be generated by the versioning module 580. In one aspect, the versioning module 580 generates and associates the object version identifier (e.g., the new object version identifier) with the scenario object 514 before the scenario object 514 is stored in the local database 548. In a general aspect, the local database 548 may be configured to store the process integration scenario 510 in the industry standard language and the object version identifier (e.g., the new object version identifier).

In a general aspect, when the mobile device 540 possesses an online connection with a network, the edited process integration scenario (e.g., the edited scenario objects 514 of the scenario 510) may be transmitted to a central database 107, 407 of a back-end server 102, 402 (e.g., an ESR server) as described in the context of FIG. 1 or 4a. For example, the PVC component 405 in FIG. 4a may recognize that there is a new (i.e. more recent) object version identifier for the scenario object 514 of the scenario 510. For instance, a conflict may be presented to the user when logging on to the back-end server. The user may be provided with the possibility to select either the back-end version stored in a central database of the back-end server or the object version stored in the local database 548 as the version to be stored on the central database of the back-end server. For example, the existing object version in the central database may be overwritten by the object version from the local database 548. For instance, the object version stored in the central database is stored in the same industry standard language as the object version stored in the local database 548.

Figure 6A:
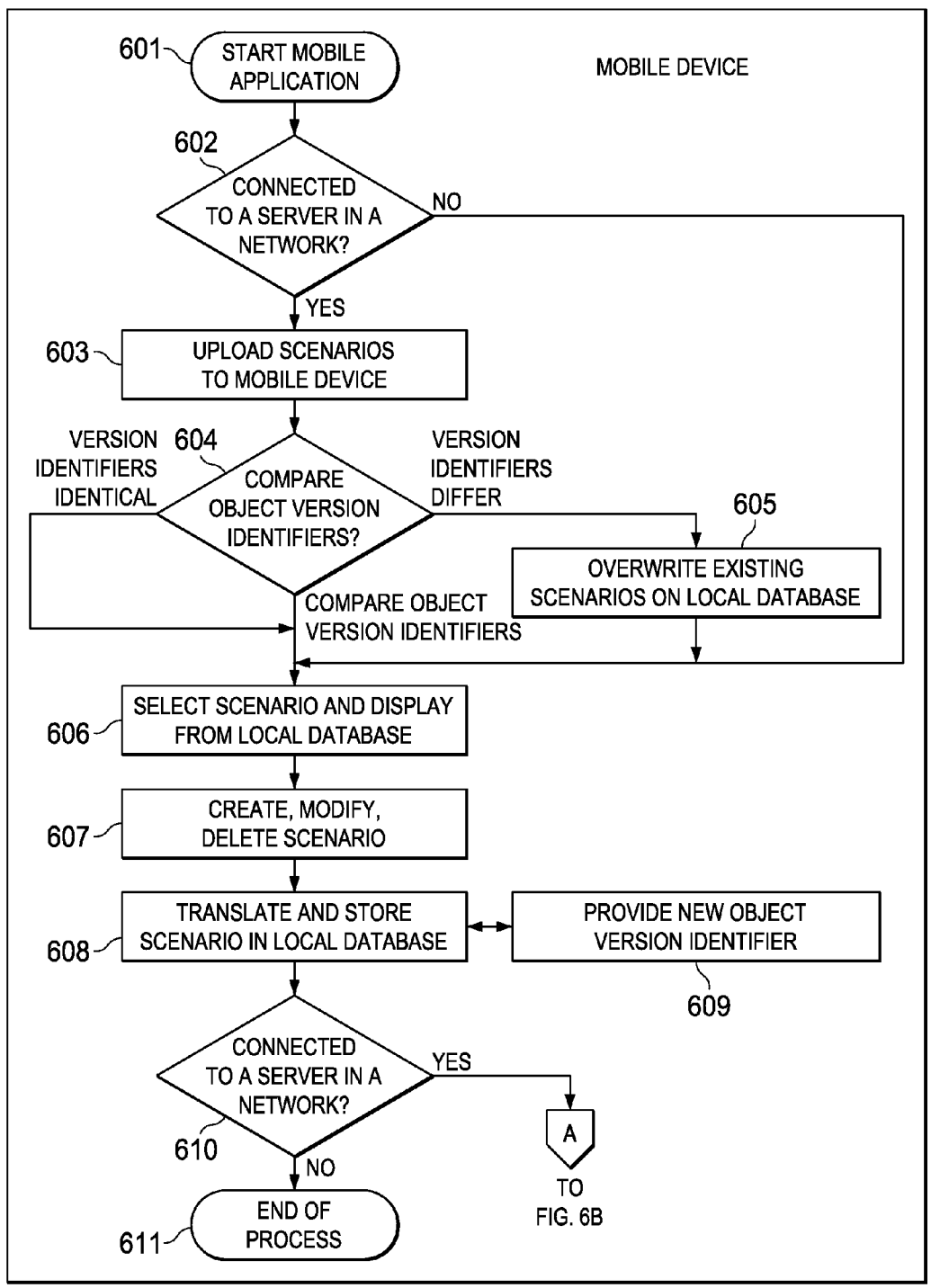
FIGS. 6a and 6b are a flow chart for developing process integration scenarios on mobile devices.
Figure 6B:
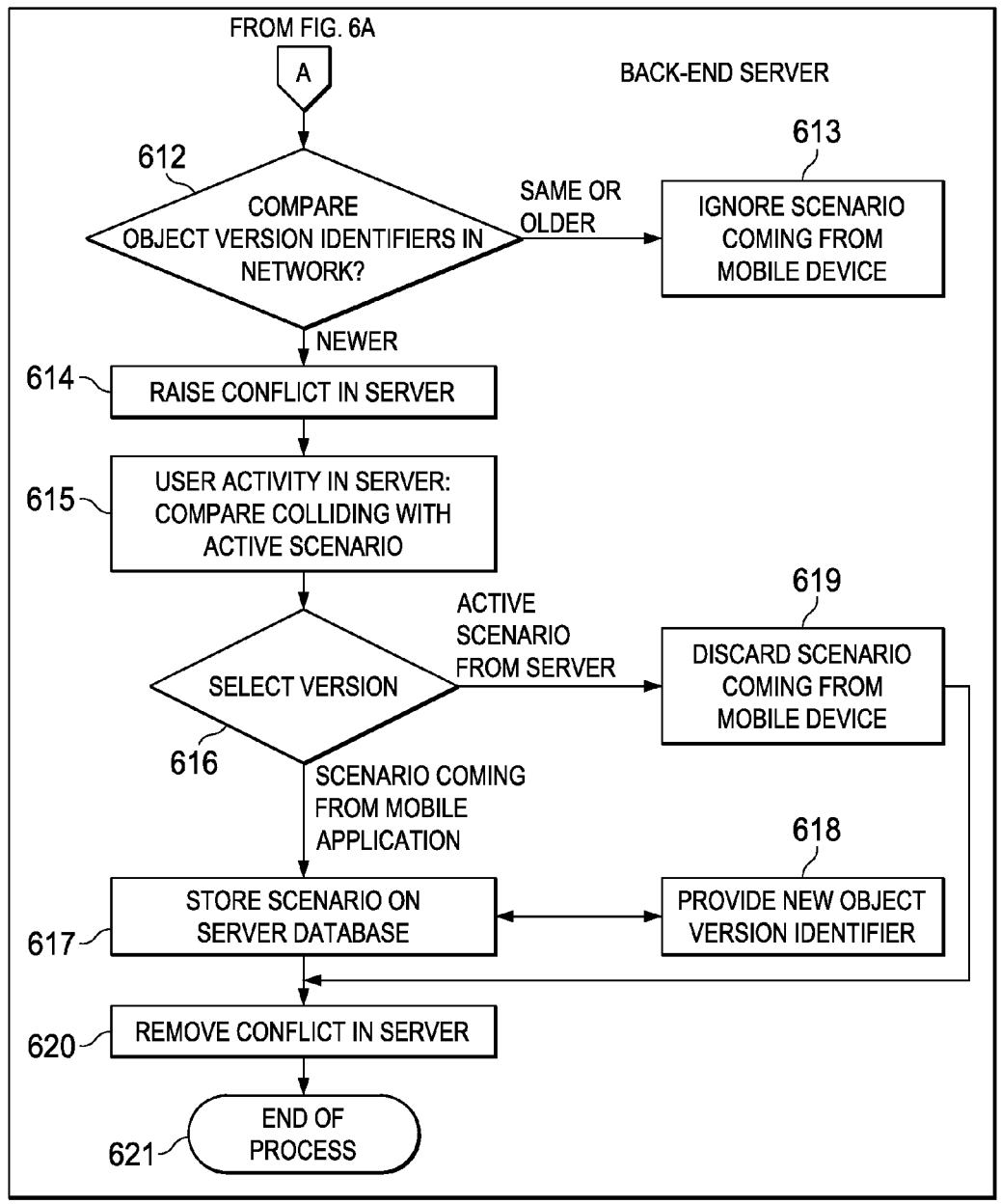

FIGS. 6a and 6b are an example flow chart for developing process integration scenarios on a mobile device. FIGS. 6a and 6b illustrate an exemplary process flow for developing scenarios on a mobile device from starting a mobile application on the mobile device via developing a process integration scenario until synchronizing the scenario with a back-end server (e.g., an ESR server). When starting the mobile application on the mobile device at step 601, the mobile device checks at step 602 whether there is a network connection to the back-end server possible. For example, this may be done by using Sybase client libraries configured on the mobile device, as described in the context of FIGS. 1, 4a. For instance, the Sybase client libraries may connect to Sybase Unwired Platform (SUP) which is a server application installed in the network, as described in the context of FIGS. 1, 4a. For instance, on the SUP the mobile device has to be registered before. For example, in case SUP identifies the mobile device as trusted client and accepts a request to connect to the back-end server and establishes the network connection to the back-end server.

At step 603, the user of the mobile device may start an inbound synchronization process (e.g., from the back-end server to the mobile application), so that scenario objects of the process integration scenarios are uploaded into a local database of the mobile device. The scenario objects may be stored in an industry standard language in the local database. In some exemplary implementations, the local database may be a memory being attached to the mobile device or a memory external to the mobile device and external to the back-end server. For example, service interfaces may also be imported, as they may be added to the action objects by the scenario editor included in the mobile application.

At step 604, a versioning module included in the mobile application may compare the object version identifiers of the uploaded scenario objects between the back-end server and the local database of the mobile device. For example, a version synchronization controller included in the versioning module may compare the object version identifiers. In a general aspect, in case the object version identifiers differ, the existing scenario objects in the local database are overwritten at step 605 and the inbound synchronization process may be cancelled (e.g., automatically or by a user of the mobile device). In a general aspect, scenario objects from the back-end server with identical object identifiers and identical object version identifiers may be ignored and may not be imported and/or uploaded again. In an aspect, the back-end server may be the leading (or master) application, so that when a scenario object is being imported from the back-end server by the mobile application, all object versions in the local database of the mobile device are overwritten at step 605.

After the inbound synchronization process is finished, the user may stay connected to the back-end server or may log off from the back-end server or even from the network, since the scenario objects are stored (e.g., locally) in the local database and the mobile application may be used in an offline mode.

At step 606, the user may select a scenario from a list of scenarios in the local database. For instance, the scenario may comprise at least one of the following scenario objects business components, actions and connections. For example, a process integration scenario may be retrieved from the local database and may be visualized on a graphical user interface of the mobile device as graphical elements using a parser that is included in the mobile application. For example, the parser may translate the scenario object included in the scenario from the industry standard language into graphical elements.

At step 607, the user may edit the graphical elements associated to the process integration scenario. For example, the user may edit one or more graphical elements of one or more scenario objects included in the scenario. For example, the graphical elements may be associated with a process integration scenario and/or scenario objects included in the scenario. In a general aspect, editing comprises creating, modifying (e.g., updating), or deleting.

At step 608, a renderer included in the mobile application may translate the edited graphical element into an industry standard language and the user may store the process integration scenario (and the scenario object included in the scenario) associated with the edited graphical element, in the industry standard language in the local database. When the user saves the edited scenario (or changes he made), a random number generator included in the versioning module provides at step 609 a new object version identifier which may be stored together with the scenario object, e.g. as one of its attributes, in the local database.

At step 610, it is determined if the mobile device is connected to the back-end server in a network. In case the user is working offline with the mobile device, the process ends here for the time being at step 611. In case the mobile device is connected (e.g. it is still connected or it re-established a connection to the back-end server) to the back-end server, a notification is presented to the user on the mobile device at step 612.

At step 612, the notification presented to the user on the mobile device indicates that a scenario object in the local database has been edited and can be synchronized with the central database of the back-end server in an outbound synchronization process. If the user decides to start the outbound synchronization process, the edited scenario object is being published to the back-end server via the same process as for retrieving the scenarios at steps 602 and 603. For example, the Sybase client libraries, the SUP and the gateway are employed as described at step 602 and in context of FIG. 1 or 4a. For example, a transformation between OData protocol and other protocols may be applied to the scenario object. In a general aspect, at step 612 the object version identifier of the scenario object from the local database is compared with one or more object version identifiers of scenario objects in the central database of the back-end server. For example the propagation versioning and change (PVC) component of the back-end server may compare the object version identifiers.

If the object version identifier of the scenario object in the local database is the same or older compared to the object version identifier of the scenario object in the central database, the scenario object in the local database is ignored at step 613.

In case the object version identifier of the scenario object in the local database is newer (e.g. more recent or updated) compared to the object version identifier of the scenario object in the central database, a conflict may be raised at step 614 in the back-end server.

At step 615, the user may be provided with an option to compare the scenario objects in the local database and with the object in the central database. For example, the user may be provided with a visualization of the scenario objects being compared.

At step 616, the user or an administrator is provided with an option to select between the scenario object stored in the local database and the scenario object stored in the central database.

If the scenario object in the local database is selected, the scenario object is stored at step 617 in the same industry standard language in the central database as it is stored in the local database.

At step 618 the scenario object just stored at step 614 in the central database is associated with a new object version identifier, e.g., the PVC component in the back-end application of the back-end server may provide the new object version identifier.

At step 619, in case the scenario object in the local database is not selected, but rather the scenario object stored in the central database is selected at step 616, then the scenario object in the local database, e.g. coming from the mobile device, is discarded.

For example, in case the newer, edited scenario object coming from the mobile device should not overwrite the master scenario object stored in the central database, the scenario object coming from the mobile device is rejected. While the scenario object may be rejected, in some instances, the rejected version may be maintained for possible future use or revisions in light of other updated versions of the scenario object. In case the newer object coming from the mobile device is considered to be the scenario object of choice, the PVC component may provide a new object version identifier and the scenario object is stored in the central database of the back-end server.

At step 620, the conflict raised at step 614 is removed in the back-end server.

At step 621, the exemplary process described in FIGS. 6a and 6b may end.

Turning to further differences between the functional scope of a back-end server like an ESR server and the described light-weight environment that may be realized for developing process integration scenarios on mobile devices according to particular aspects, implementations or embodiments described in the present disclosure. For example, ESR may be a mighty and heavyweight client server application. For instance, the back-end server part may be based on a Java platform. For example, on the client side, the user interface may necessarily be Java-based, too (e.g., based on Java Swing Client). For instance, ESR as the development for scenario objects may provide CRUD (create, read, update, delete) operations for one or more of the following objects: action, integrations process, monitoring process, step group, alert category, model, object definition, service interface, message type, fault message type, data type, data type enhancement, external definition, context object, business object, business object enhancement, agent, user interface text object, process component, operating mapping, message mapping function library, mapping template, imported archive, adapter metadata, communication channel template, change list, software component version, folder, namespace, usage profile, and connections.

In a general aspect, the scenario editor may be limited to process integration scenarios, business components, actions and connections, e.g. may be limited to core scenario objects which define the needful scenario objects for a conclusive development and integration of collaborative business processes. In this way, the requirements for the underlying development environment and versioning concept may be reduced in particular aspects or embodiments of the present disclosure. For example, it may not be required to have a complete Java runtime environment in the mobile application.

In comparison to ESR use cases, the mobile application approach according to particular aspects or embodiments of the present disclosure may have a dedicated distribution of roles: one of the ESRs used gets the role of a master system or leading application, where several mobile devices may be connected to. For example, the mobile devices may serve as clients. This aspect may allow reducing the functionality requirements of the versioning module on the mobile devices. For instance, when a mobile device connects to the master ESR, a bidirectional synchronization (e.g., sequential in- and outbound synchronization) process may be started. In a general aspect, the object version identifier may be an alphanumeric code.

Returning to FIG. 1, the illustrated example distributed computing system 100 also includes the mobile device 140, or multiple mobile devices 140a-d. The mobile device 140 may be any computing device operable to connect to or communicate with at least the back-end server 102 via the network 130 using a wired or wireless connection, such as local or wide area connection (e.g., via Internet or via an Intranet). In general, the mobile device 140 comprises a processor 144 operable to receive, transmit, process, and store any appropriate data associated with the example distributed computing system 100.

The illustrated mobile device 140 further may include an interface 152, a processor 144, and a local database 148. The interface 152 is used by the mobile device 140 for communicating with other systems in a distributed environment—including within the example distributed computing system 100—connected to the network 130; for example, the back-end server 102, as well as other systems communicably coupled to the network 130 (not illustrated). Generally, the interface 152 comprises logic encoded in software and/or hardware in a suitable combination and operable to communicate with the network 130. More specifically, the interface 152 may comprise software supporting one or more communication protocols associated with communications such that the network 130 or interface's hardware is operable to communicate physical signals within and outside of the example distributed computing system 100.

As illustrated in FIG. 1, the mobile device 140 includes a processor 144. Although illustrated as a single processor 144 in FIG. 1, two or more processors may be used according to particular needs, desires, or particular implementations of the example distributed computing system 100. Each processor 144 may be a central processing unit (CPU), an application specific integrated circuit (ASIC), a field-programmable gate array (FPGA), or another suitable component. Generally, the processor 144 executes instructions and manipulates data to perform the operations of the client 140. Specifically, the processor 144 executes the functionality required to send requests to the back-end server 102 and to receive and process responses from the back-end server 102.

Processors 144 suitable for the execution of a computer program include, by way of example, both general and special purpose microprocessors, and any one or more processors of any kind of digital computer. Generally, a processor will receive instructions and data from a read-only memory or a random access memory or both. The essential elements of a computer, server or mobile device 140 may be a processor for performing actions in accordance with instructions and one or more memory devices for storing instructions and data. Generally, a computer, server or mobile device 140 will also include, or be operatively coupled to receive data from or transfer data to, or both, one or more mass storage devices for storing data, e.g., magnetic, magneto-optical disks, or optical disks. However, a computer, server or mobile device 140 need not have such devices. Moreover, mobile device 140 can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive or USB stick), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The illustrated mobile device 140 is intended to encompass any computing device such as a desktop computer, laptop/notebook computer, tablet computer, wireless data port, smart phone, cell phone, PDA, e-book reader, one or more processors within these devices, or any other suitable processing device. For example, the mobile device 140 may comprise a computer that includes an input device, such as a keypad, touch screen, or other device that can accept user information, and an output device that conveys information associated with the operation of the back-end server 102 or the mobile device 140 itself, including digital data, visual information (such as, e.g., graphical elements), or a GUI 142, as shown with respect to the mobile device 140.

Further, the illustrated mobile device 140 includes a GUI 142. The GUI 142 interfaces with at least a portion of the example distributed computing system 100 for any suitable purpose, including generating a visual representation of a web browser. In particular, the GUI 142 may be used to view and navigate various web pages located both internally and externally to the back-end server 102.

To provide for interaction with a user, aspects of the subject-matter described in this specification can be implemented on a mobile device having the GUI 142 comprising a non-flexible or flexible screen, e.g., a CRT (cathode ray tube), LCD (liquid crystal display) or OLED (organic light emitting diode) monitor, for displaying information to the user and a keyboard and a pointer, e.g., a finger, a stylus, a mouse or a trackball, by which the user can provide input to the mobile device. Other kinds of components can be used to provide for interaction with a user as well; for example, feedback provided to the user can be any form of sensory feedback, e.g., touch feedback, visual feedback, auditory feedback, or tactile feedback; and input from the user can be received in any form, including acoustic, speech, touch or tactile input.

The illustrated mobile device 140 may also include a local database 148, or multiple local databases 148. The local database 148 may include any memory or database module and may take the form of volatile or non-volatile memory including, without limitation, magnetic media, optical media, random access memory (RAM), read-only memory (ROM), removable media, or any other suitable local or remote memory component. The memory 148 may store various objects or data, including caches, classes, frameworks, applications, backup data, scenario objects in any industry standard language, jobs, web pages, web page templates, database tables, repositories storing business and/or dynamic information, and any other appropriate information including any parameters, variables, algorithms, instructions, rules, constraints, or references thereto associated with the purposes of the mobile device 140. Additionally, the local database 148 may include any other appropriate data, such as VPN applications, firmware logs and policies, firewall policies, a security or access log, print or other reporting files, as well as others.

There may be any number of mobile devices 140 associated with, or external to, the example distributed computing system 100. For example, while the illustrated example distributed computing system 100 includes one mobile device 140, alternative implementations of the example distributed computing system 100 may include multiple mobile device 140 communicably coupled to the back-end server 102 and/or the network 130, or any other number suitable to the purposes of the example distributed computing system 100. Additionally, there may also be one or more additional mobile device 140 external to the illustrated portion of the example distributed computing system 100 that are capable of interacting with the example distributed computing system 100 via the network 130. Further, the term "client" and "user" may be used interchangeably as appropriate without departing from the scope of this disclosure. Moreover, while the mobile device 140 is described in terms of being used by a single user, this disclosure contemplates that many users may use one mobile device or computer, or that one user may use multiple mobile devices or computers.

The preceding figures and accompanying description illustrate example processes and computer implementable techniques. But example distributed computing system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the steps in these processes may take place simultaneously, concurrently, in parallel, and/or in different orders than as shown. Moreover, example distributed computing system 100 may use processes with additional steps, fewer steps, and/or different steps, so long as the methods remain appropriate. Process steps may also be executed and described software/services may also execute on various components of example distributed computing system 100 so long as the methods remain appropriate. Moreover, although features may be described above as acting in certain combinations and even initially claimed as such, one or more features from a claimed combination can in some cases be excised from the combination, and the claimed combination may be directed to a sub-combination or variation of a sub-combination.

In other words, although this disclosure has been described in terms of certain aspects, implementations, embodiments or generally associated methods, alterations and permutations of these aspects, implementations or methods will be apparent to those skilled in the art. Accordingly, the above description of example aspects, implementations or embodiments do not define or constrain this disclosure. Other changes, substitutions, and alterations are also possible without departing from the spirit and scope of this disclosure.

What is claimed is:

1. A system for developing a process integration scenario on a mobile device, the system comprising:
  a mobile device capable of communicably connecting to a back-end process integration server remote from the mobile device, the mobile device including:
    at least one processor;
    a mobile application on the mobile device, the mobile application operable when executed by the at least one processor to perform operations associated with developing process integration scenarios, the mobile application including:
      a scenario editor operable when executed by the at least one processor to edit a graphical element of the process integration scenario based on input received at a graphical user interface of the mobile device;
      a renderer operable when executed by the at least one processor to translate the graphical element into an industry standard language; and
      a versioning module operable when executed by the at least one processor to generate an object version identifier that is associated with the process integration scenario;
    a local database operable when executed by the at least one processor to store the process integration scenario in the industry standard language and the object version identifier, wherein the local database stores an edited version of the process integration scenario when the edited version of the process integration scenario is developed when the mobile device is not communicably connected to the back-end process integration server;
    wherein the mobile application is further operable when executed by the at least one processor to perform an outbound synchronization of the stored edited version of the process integration scenario from the local database to the back-end process integration server in response to the communicable connection to the back-end process integration server being established; and wherein during the outbound synchronization of the stored edited version of the process integration scenario from the local database to the back-end process integration server, an administrator or user associated with the mobile device is provided with an option to select, at the mobile device, between the edited version of the process integration scenario stored in the local database and a previously stored version of the process integration scenario stored in a central database on the back-end process integration server to be stored in the central database on the back-end process integration server.

2. The system of claim 1, wherein the process integration scenario associated with the graphical element being edited by the editor is retrieved from the local database and comprises at least one of the following scenario objects: application components, actions and connections, wherein the scenario object is associated with an object identifier and a version of the scenario object is associated with the object version identifier, and wherein the editing of the graphical element of the process integration scenario comprises creating, modifying or deleting the scenario object included in the scenario.

3. The system of claim 2, wherein the process integration scenario represents a business process between business components, the business components represent business partners, the actions represent process steps between the business partners and the connections represent channels between the actions configured for an exchange of electronic messages, and wherein the industry standard language is based on Web Services Business Process Execution Language, Business Process Model and Notation, or Web Services Description Language.

4. The system of claim 2, wherein during the editing, translating, and storing the mobile application can be communicably disconnected from the back-end process integration server.

5. The system of claim 1, wherein, during the outbound synchronization, the back-end process integration server compares an object version identifier associated with at least a portion of the previously stored version of the process integration scenario stored in the central database with the object version identifier associated with at least a portion of the edited version of the process integration scenario stored in the local database.

6. The system of claim 5, wherein if the process integration scenario stored in the local database is selected by the administrator or user associated with the mobile device, the process integration scenario stored in the local database is stored in the central database in the same industry standard language as it is stored in the local database and at least a portion of the process integration scenario is associated with a new object version identifier.

7. The system of claim 1, wherein before the scenario editor edits the graphical element of the process integration scenario a parser of the mobile application translates the scenario from the industry standard language into the graphical element and visualizes the graphical element at the graphical user interface.

8. A method for developing a process integration scenario on a mobile device, the method comprising:
running, by at least one processor, a mobile application on the mobile device, the mobile device capable of communicably connecting to a back-end process integration server remote from the mobile device, the mobile application operable when executed by the at least one processor to perform operations associated with developing process integration scenarios;

editing, by the at least one processor, a graphical element of the process integration scenario by a scenario editor of the mobile application based on input from a graphical user interface of the mobile device;

translating, by the at least one processor, the graphical element into an industry standard language by a renderer of the mobile application;

generating, by the at least one processor, an object version identifier that is associated with the process integration scenario by a versioning module of the mobile application;

storing, by the at least one processor, the process integration scenario in the industry standard language and the object version identifier in a local database, wherein the local database stores an edited version of the process integration scenario when the edited version of the process integration scenario is developed when the mobile device is not communicably connected to the back-end process integration server;

performing an outbound synchronization of the stored edited version of the process integration scenario from the local database to the back-end process integration server in response to the communicable connection to the back-end process integration server being established; and providing, during the outbound synchronization of the stored edited version of the process integration scenario from the local database to the back-end process integration server, an administrator or user associated with the mobile device with an option to select, at the mobile device, between the edited version of the process integration scenario stored in the local database and a previously stored version of the process integration scenario stored in a central database on the back-end process integration server to be stored in the central database on the back-end process integration server.

9. The method of claim 8, wherein the process integration scenario associated with the graphical element being edited by the editor is retrieved from the local database and comprises at least one of the following scenario objects: application components, actions and connections, wherein the scenario object is associated with an object identifier and a version of the scenario object is associated with the object version identifier, and wherein the editing of the graphical element of the process integration scenario comprises creating, modifying or deleting at least one of the scenario objects included in the scenario.

10. The method of claim 9, wherein the process integration scenario represents a business process between business components, the business components represent business partners, the actions represent process steps between the business partners and the connections represent channels between the actions configured for an exchange of electronic messages, and wherein the industry standard language is based on Web Services Business Process Execution Language, Business Process Model and Notation, or Web Services Description Language.

11. The method of claim 8, wherein during the editing, translating, generating, and storing the mobile application can be communicably disconnected from the back-end process integration server.

12. The method of claim 8, further comprising, during the outbound synchronization, comparing by the back-end process integration server an object version identifier associated with at least a portion of the previously stored version of the process integration scenario stored in the central database with the object version identifier associated with at least a portion of the edited version of the process integration scenario stored in the local database.

13. The method of claim 12, wherein if the process integration scenario stored in the local database is selected by the administrator or user associated with the mobile device, storing the process integration scenario stored in the local database in the central database in the same industry standard language as it is stored in the local database and associating at least a portion of the process integration scenario with a new object version identifier.

14. The method of claim 8, wherein before the editing of the graphical element of the process integration scenario translating the scenario from the industry standard language into the graphical element by a parser of the mobile application and visualizing the graphical element at the graphical user interface by the parser.

15. A mobile device having a mobile application stored thereon configured to develop a process integration scenario, wherein the mobile device is capable of communicably connecting to a back-end process integration server remote from the mobile device, the mobile device comprising:
  at least one processor;
  a scenario editor operable when executed by the at least one processor to edit a graphical element of the process integration scenario based on input from a graphical user interface of the mobile device;
  a renderer operable when executed by the at least one processor to translate the graphical element into an industry standard language;
  a versioning module operable when executed by the at least one processor to generate an object version identifier that is associated with the process integration scenario; and
  a local database operable when executed by the at least one processor to store the process integration scenario in the industry standard language and the object version identifier, wherein the local database stores an edited version of the process integration scenario when the edited version of the process integration scenario is developed when the mobile device is not communicably connected to the back-end process integration server; and
  a synchronization module operable when executed by the at least one processor to perform an outbound synchronization of the stored edited version of the process integration scenario from the local database to the back-end process integration server in response to the communicable connection to the back-end process integration server being established; and
  wherein during the outbound synchronization of the stored edited version of the process integration scenario from the local database to the back-end process integration server, an administrator or user associated with the mobile device is provided with an option to select, at the mobile device, between the edited version of the process integration scenario stored in the local database and a previously stored version of the process integration scenario stored in a central database on the back-end process integration server to be stored in the central database on the back-end process integration server.

16. The mobile device of claim 15, wherein the process integration scenario associated with the graphical element being edited by the editor is retrieved from the local database and comprises at least one of the following scenario objects: application components, actions and connections, wherein the scenario object is associated with an object identifier and a version of the scenario object is associated with the object version identifier, and wherein the editing of the graphical element of the process integration scenario comprises creating, modifying or deleting the scenario object included in the scenario.

17. The mobile device of claim 16, wherein the process integration scenario represents a business process between business components, the business components represent business partners, the actions represent process steps between the business partners and the connections represent channels between the actions configured for an exchange of electronic messages, and wherein the industry standard language is based on Web Services Business Process Execution Language, Business Process Model and Notation, or Web Services Description Language.

18. The mobile device of claim 15, during the editing, translating and storing the mobile application can be communicably disconnected from the process integration back-end server.

19. The mobile device of claim 15, wherein, during the outbound synchronization, the back-end process integration server compares an object version identifier associated with at least a portion of the previously stored version of the process integration scenario stored in the central database with the object version identifier associated with at least a portion of the edited version of the process integration scenario stored in the local database.

20. The mobile device of claim 19, wherein if the process integration scenario stored in the local database is selected by the administrator or user associated with the mobile device, the process integration scenario stored in the local database is stored in the central database in the same industry standard language as it is stored in the local database and at least a portion of the process integration scenario is associated with a new object version identifier.

21. The mobile device of claim 15, wherein before the scenario editor edits the graphical element of the process integration scenario a parser translates the scenario from the industry standard language into the graphical element and visualizes the graphical element at the graphical user interface.

* * * * *